US007891084B1

(12) United States Patent
Sollami

(10) Patent No.: US 7,891,084 B1
(45) Date of Patent: Feb. 22, 2011

(54) EXTRACTION DEVICE FOR REMOVING A QUICK-CHANGE TOOL HOLDER FROM A BASE BLOCK MOUNTING

(75) Inventor: Phillip A. Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 1114 days.

(21) Appl. No.: 11/633,298

(22) Filed: Dec. 4, 2006

Related U.S. Application Data

(63) Continuation-in-part of application No. 10/998,432, filed on Nov. 29, 2004, now abandoned.

(51) Int. Cl.
*B23P 19/00* (2006.01)

(52) U.S. Cl. ........................................ 29/760; 29/426.5

(58) Field of Classification Search ................ 29/426.5, 29/700, 760, 760.3, 243, 259, 278, 280, 282, 29/426.1; 408/147; 411/296
See application file for complete search history.

(56) References Cited

U.S. PATENT DOCUMENTS

| | | | |
|---|---|---|---|
| 4,989,312 | A | 2/1991 | Maddalena |
| 6,220,671 | B1 | 4/2001 | Montgomery, Jr. |
| 2003/0015907 | A1 | 1/2003 | Sollami |
| 2006/0022510 | A1 | 2/2006 | Sansone |

*Primary Examiner*—John C Hong
(74) *Attorney, Agent, or Firm*—Robert L. Marsh

(57) ABSTRACT

A device for extracting a tool holder from a base block mounting has a front plate and a pair of rearwardly extending arms contacting the base block mounting. An extraction nut has at least two parallel threaded holes therein. A threaded stud is threaded into one of the threaded holes and the length extends through a hole in the front plate and through the tool holder and is retained by a nut. An extraction bolt is threaded through the second threaded hole of the extraction nut with the distal end engaging the front plate.

18 Claims, 5 Drawing Sheets

EXTRACTION DEVICE FOR REMOVING A QUICK-CHANGE TOOL HOLDER FROM A BASE BLOCK MOUNTING

This is a continuation-in-part of my application filed Nov. 29, 2004 and assigned Ser. No. 10/998,432 now abandoned. The present application relates to quick-change tool holders for receiving rotatable tools on a machine for cutting hard surfaces, and in particular to a device for extracting a worn out quick-change tool holder from a base block mounting on a machine.

BACKGROUND OF THE INVENTION

Machines used for cutting hard surfaces, such as concrete and asphalt pavement, rock and the like, employ rotatable tools having a tapered forward cutting end behind which is an axially extending shank rotatably fitted in a tool holder. Where a quick-change tool holder is employed, the tool holder itself has a tapered forward end behind which is an axial shank that is received in the bore of a base block mounting on a machine. Base block mountings are secured to a rotatable wheel or drum, which forces the forward cutting ends of the tools retained in the various tool holders against the hard surface to be cut.

Where such tools are used to cut hard material such as asphalt or concrete, the tools retained in the quick-change tool holders must rotate to wear evenly around their circumference and thereby maximize their useful life. The hard material engaged by such tools none the less wears the tool rapidly. When the machine is used to cut hard surfaces it is common to replace the tools therein at least once a day. The same hard use that causes the tools to become rapidly worn eventually causes wear to the tool holders that receive the rotatable shanks of the tools. Although the life expectancy of such tool holders may be one hundred times or several hundred times the life of the tools received therein, extended usage of a machine will result in the tool holders becoming worn and requiring replacement.

It has become common to use a quick-change tool holder having a tapered forward end and an axially rearwardly extending shank that is received in a complementarily shaped bore of a base block mounting on the machine to simplify the replacement of worn tool holders. The distal end of the shank of the quick-change holder is threaded and extends beyond a rearward surface of the base block mounting, and a nut threaded on the distal end of the shank retains the quick-change tool holder in the base block mounting. Preferably, the quick-change holder is of the type disclosed in my previously issued U.S. Pat. Nos. 6,371,567 B1 and 6,585,326 B2, which are incorporated herein by reference.

Ideally, such quick-change tool holders are easily removed from the base blocks on the machine by using a punch and hammer to withdraw the shank out of the bore of the base block mounting. The strong forces applied to the tools, the tool holders, and the base block mountings, as the machine cuts hard surfaces, however, can cause the various parts to become deformed such that the shank of the quick-change tool holder can't be easily extracted from the bore of a base block mounting. The hard material cut by the machine also produces fines that work their way between the surfaces of the various parts and further inhibit the movement of one part with respect to another. As a result of the forgoing, it is often difficult to remove the shank of a quick-change tool holder from the bore of a base block mounting.

Presently, it is the practice to use a hammer and a punch or the like against the distal end of the shank of the tool holder to drive the shank out of the bore of the tool holder. Where the shank has become tightly bound into the bore of the tool holder, however, driving a worn shank out of a tool holder may be exceedingly difficult.

An alternative method of extracting such tool holders is to apply a tool against the radial flange that defines the rearward end of the tapered forward portion of the quick-change tool holder. The tool holder may include a notch or another configuration to allow the forward end of a punch or the like to be applied to the rear surface of the radial flange and facilitate the removal of the quick-change tool holder.

It sometimes occurs that the tapered forward end of a quick-change tool holder will become broken off during usage, leaving the shank thereof still lodged in the bore of the mounting block. In such a case, a machine operator cannot use a punch and hammer against the rear surface of the radial flange to remove the remnants of the shank of the quick-change tool holder and is limited to using a punch to drive the remnants of the shank forward through the bore.

It is also difficult for a machine operator to reach all the base block mountings for which the quick-change tool holders must be replaced. To improve the accessibility of the various base block mountings and tool holders, the operator must periodically operate the machine to partially rotate the drum and thereby bring previously inaccessible base block mountings into his reach. Where a damaged quick-change tool holder must be pounded out of its mounting block, the drum must be rotated so that the damaged parts are most accessible to the operator before removing the worn part. The process of removing damaged quick-change tool holders, therefore, can consume a great amount of time. Such down time has been greatly reduced by the provision of the quick-change tool holders, but it would, none the less, be desirable to provide an improved method and apparatus for removing a worn quick-change tool holder from a base block mounting. It would be further desirable to provide a method and apparatus for removing the remaining shank of a quick-change tool holder after the forward end thereof has been broken off.

SUMMARY OF THE INVENTION

Briefly, the present invention is embodied in an extraction device for removing a quick-change tool holder from a base block mounting. The quick-change tool holder is of the type having a forward surface, a rearwardly extending generally cylindrical shank with a rearward end, and an axial bore extending into the forward surface through the length thereof including the cylindrical shank and opening at the rearward end. The base block mounting has a body with an outer surface, a forward surface, a rearward surface, and a central opening extending from the forward surface to the rearward surface. The base block tightly retains the shank of the tool holder in the bore thereof, and the tool holder in turn removably retains a rotatable tool.

The device of the present invention is used to separate the quick change tool holder from the base block mounting. The device includes a front plate having a first end and a second end. An upper arm extends rearwardly from the first end of the front plate, and a longitudinally adjustable second arm extends rearwardly from the second end of the front plate with the rearward ends of the two arms having attachment surfaces that engage attachment surfaces on the base block mounting.

In the preferred embodiment a hardened pin extends radially inward from the rearward end of the upper arm. The axis of the pin is perpendicular to the axis of the bore of the base block mounting from which a quick change tool holder is to be extracted and the rearward end of the upper arm is radially moveable relative to the axis of the bore between a first position in which the distal end of the pin is spaced from the surface of the base block mounting and a second position in which the pin extends into a radially inwardly directed hole in the base block mounting for securing the second end thereto.

The device further includes an extraction nut having a first threaded hole therein and a second threaded hole parallel to and spaced a short distance from the first threaded hole. An elongate threaded stud has the forward end thereof threaded into the first hole of the extraction nut and the second end of the threaded stud is extended through a transverse hole in the front plate and then through the axial bore of the quick change holder. The rearward end of the threaded stud extends outward of the rearward end of the shank of the tool holder and a retaining nut is then threaded on the rearward end of the stud.

The device further includes a jack screw having a head, a threaded portion, and a distal end with the threaded portion of the jack screw threaded through the second threaded hole of the extraction nut and the distal end of the jack screw abutting the front plate or a washer member sandwiched between the front plate and the extraction nut. Rotation of the head of the jack screw will then urge the extraction nut away from the front plate and extract the quick-change tool holder from the base block mounting.

BRIEF DESCRIPTION OF THE DRAWINGS

A better understanding of the invention will be had after a reading of the following detailed description taken in conjunction with the drawings wherein.

DETAILED DESCRIPTION OF PREFERRED EMBODIMENT

Figure 1:
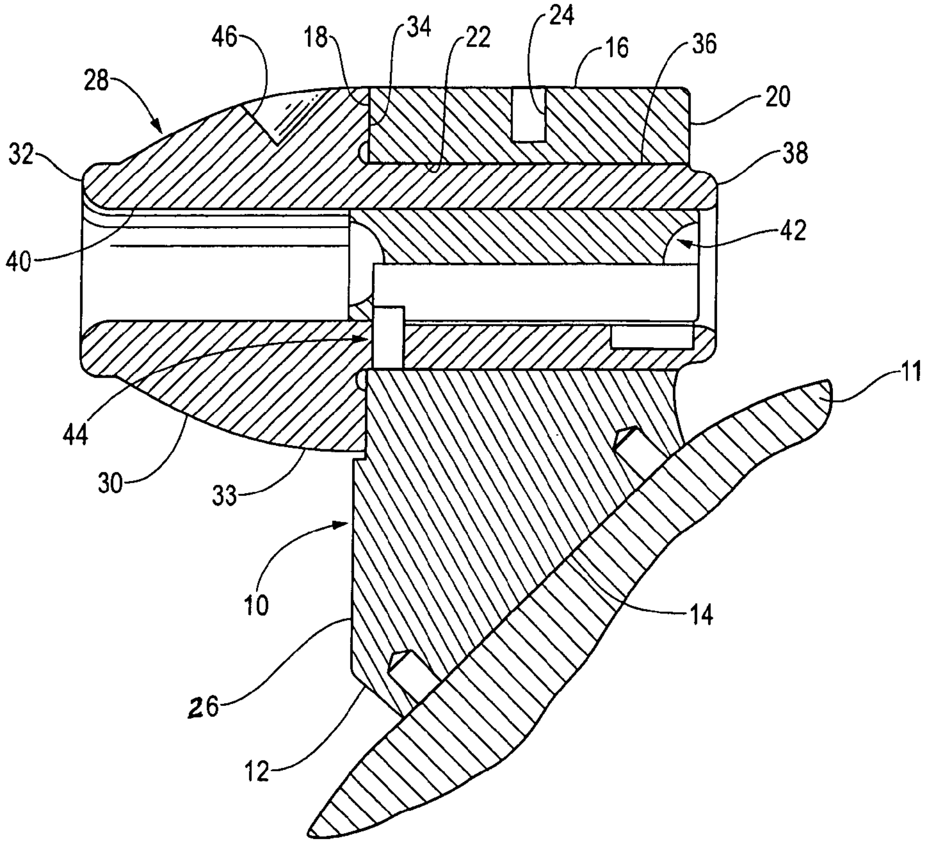
FIG. 1 is a cross-sectional view of a base block mounting having a quick-change holder therein.
Figure 2:
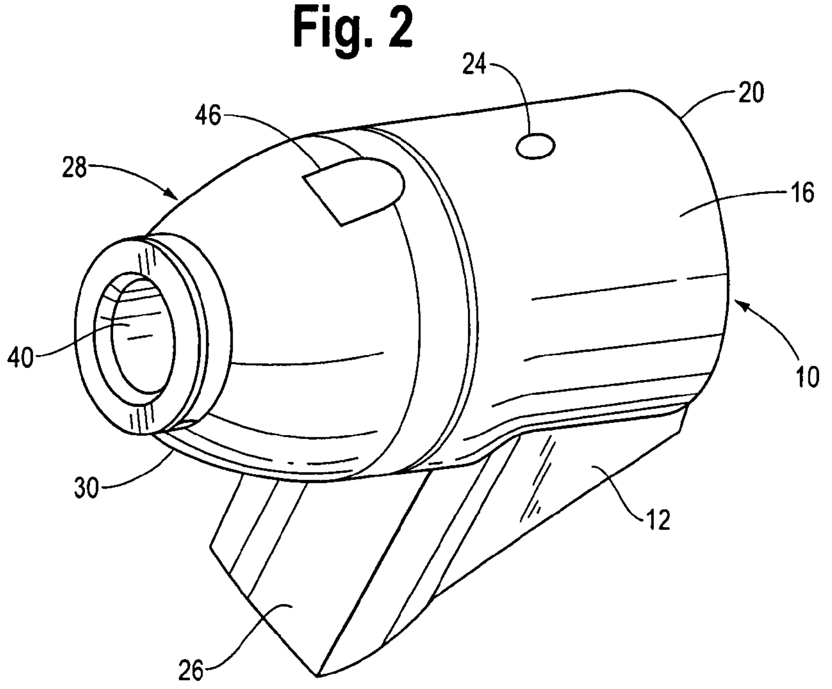
FIG. 2 is an isometric view of the base block mounting and quick-change holder shown in FIG. 1.

Referring to FIGS. 1 and 2, a machine for cutting hard surfaces includes a rotating drum on which are mounted a plurality of base block mountings 10 each of which has a mounting portion 12 having a mounting surface 14 adapted to be fitted against the surface of a mounting stand 11 mounted to the drum, not shown. Alternately, the base block mounting may be welded directly to the surface of the drum, but this structure is not commonly used. The base block mounting 10 also has a generally tubular body portion 16 having a planar forward surface 18, a generally planar rearward surface 20, and an axial bore 22 extending from the forward surface 18 to the rearward surface 20. Where the base block mounting 10 retains a quick change tool holder in accordance with my previously issued U.S. Pat. Nos. 6,371,567 B1 and 6,585,326 B2, the forward surface 18 will include a small spacing as depicted and described in my U.S. Pat. Nos. 6,371,567 B1 and 6,585,326 B2, although this feature has not been depicted in the present drawings. To be suitable for use with the extraction device in accordance with the present invention, the base block mounting 10 further has a blind bore 24 extending radially into the outer surface of the tubular body 16, and a support surface 26 on the mounting portion 12 oriented parallel to and adjacent the forward surface 18 of the generally tubular body 16.

Fitted into the bore 22 of the base block mounting 10 is a quick-change holder 28 having a forward shield portion 30 that diverges radially outwardly from a planar forward surface 32 and reaches a maximum diameter at the rearward end 33 of the shield portion 30. Behind the rearward end 33 is a rearwardly directed annular flange 34. Extending axially rearwardly of the annular flange 34 is a generally cylindrical shank 36, the outer profile of which is shaped and sized to create an interference fit with the bore 22 in the tubular body 16 of the base block mounting 10, as explained in my U.S. Pat. Nos. 6,371,567 B1 and 6,585,326 B2. At the rearward end of the cylindrical shank 36 is a transverse rear surface 38.

Extending axially through the length of the quick-change holder 28, including the shield portion 30 and the generally cylindrical shank 36 is an axial bore 40 having an inner diameter sized to receive the rotatable shank of a cutting tool, not shown. The quick-change holder 28 also has within the axial bore 40 a slideable plunger 42 retained therein by a pin 44, which will facilitate the removal of the shank of a rotatable tool, not shown, retained within the forward portion of bore 40. The shield portion 30 of the quick-change holder 28 also has at least one indentation 46 therein for receiving the end of a tool to aid in removing the quick-change holder 28 from the base block mounting 10.

When in use, the cylindrical shank 36 of a quick-change holder 28 is fitted into the axial bore 22 of the base block mounting with the annular flange 34 of the quick-change holder 28 generally abutting against the forward surface 18 of the base block mounting as shown in FIGS. 1 and 2. With the parts so assembled, the shank of a rotatable tool, not shown, is received in the axial bore 40 of the quick-change holder 28.

Figure 3:
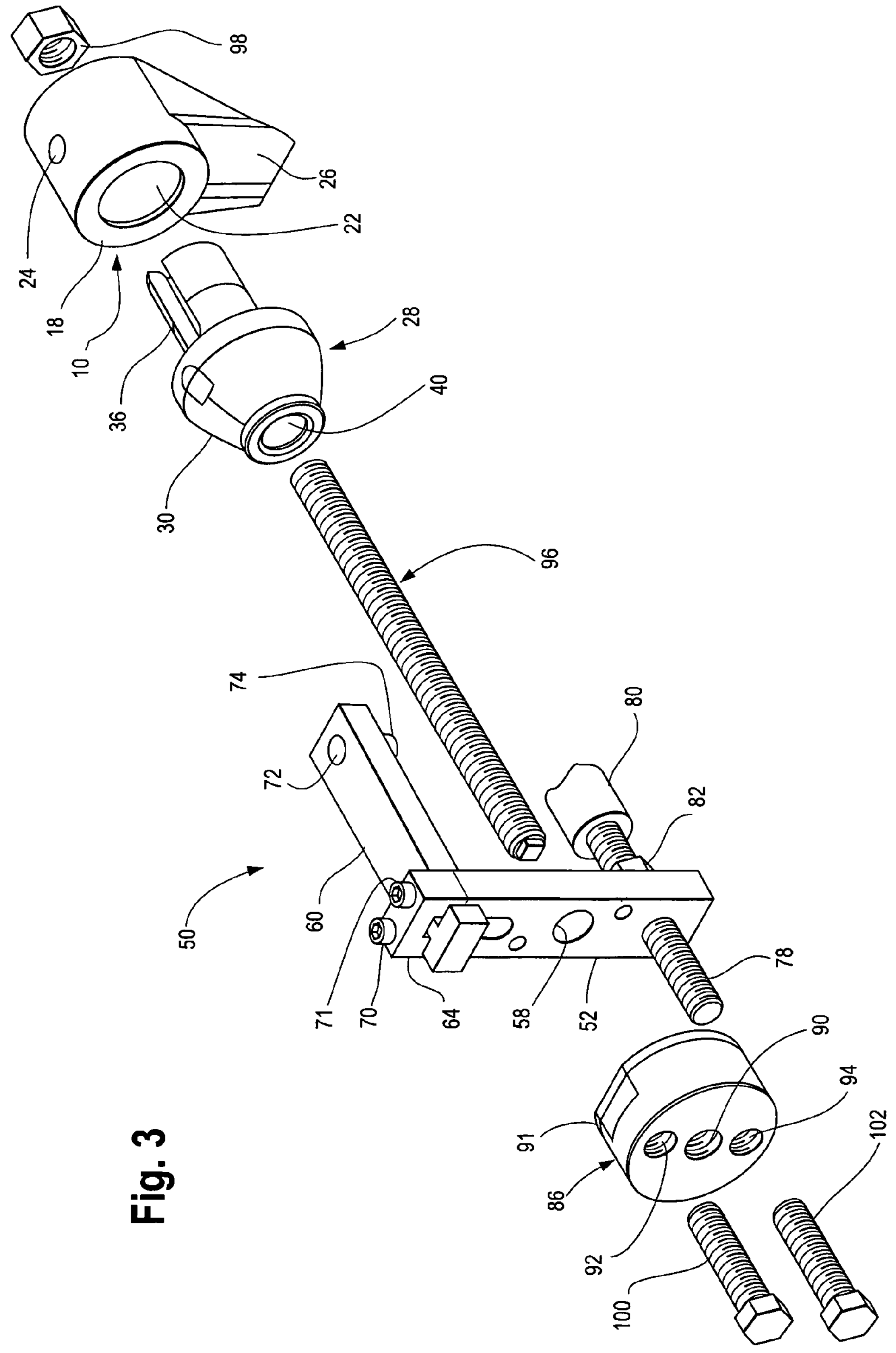
FIG. 3 is an exploded isometric view showing the parts of the preferred embodiment of the extraction device positioned around a base block mounting separated from a quick-change tool holder.
Figure 4:
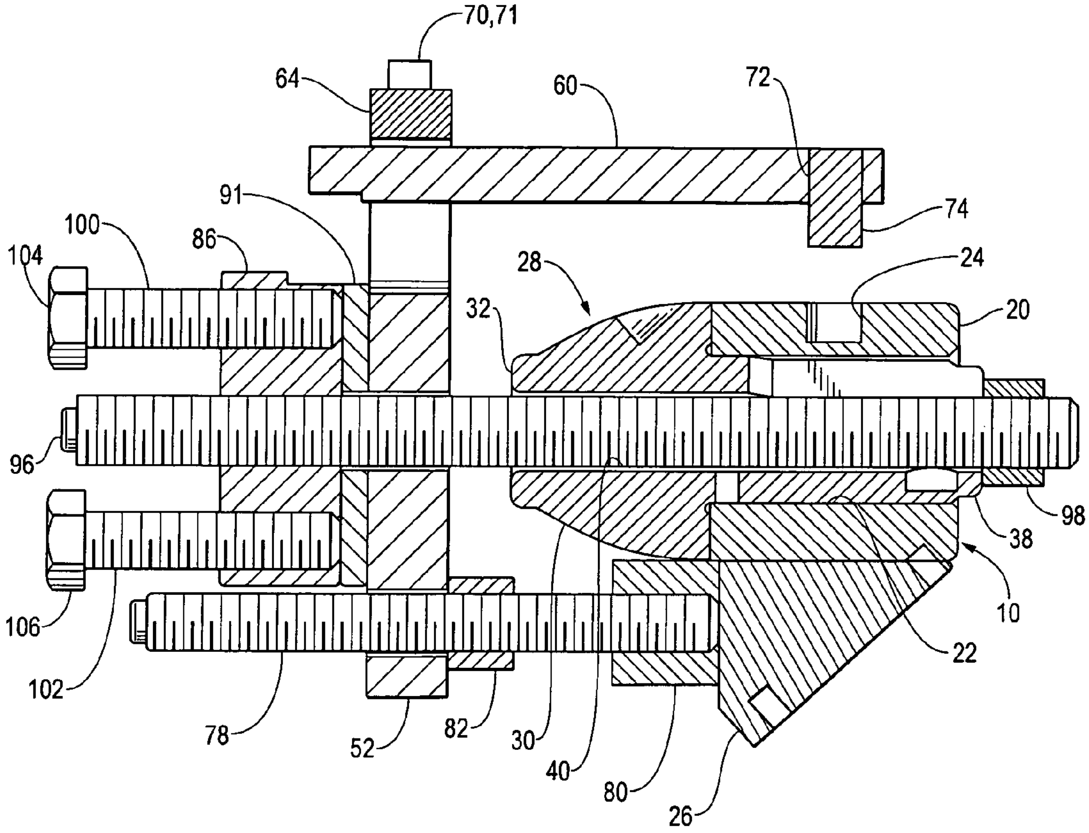
FIG. 4 is a cross sectional view of the extraction device, base block mounting and quick change tool holder shown in FIG. 3 with the outer end of the upper arm and the pin therein spaced from the surface of the base block mounting.
Figure 5:
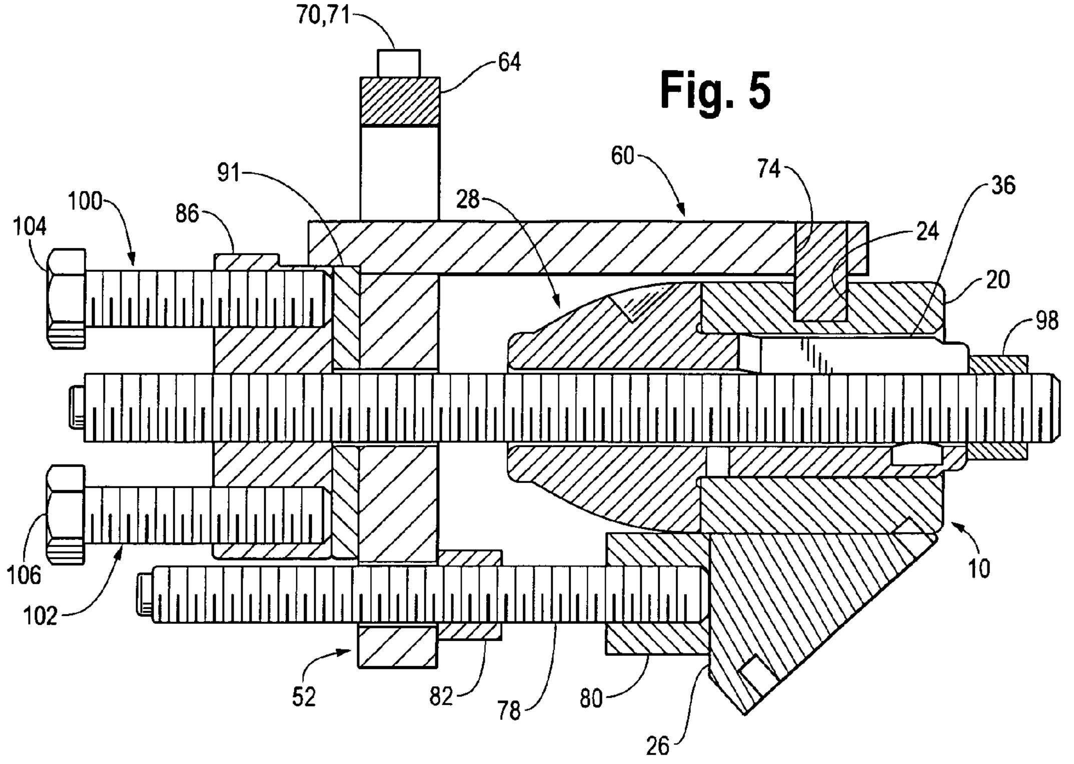
FIG. 5 is another cross sectional view of the extraction device fitted around the combined base block mounting and quick change tool holder similar to that shown in FIG. 4, but fully assembled thereto such that the outer end of the upper arm is against the outer surface of the base block mounting and the pin extends into a hole therein.

Referring to FIGS. 3 to 5 and 9 to 11, over time the shield portion 30 and the axial bore 40 of the quick-change holder 28 become worn and require replacement. To replace the quick-change holder 28, the shank thereof must be removed from the axial bore 22 in the tubular body 16 of the base block mounting 10. To aid in this removal, an extraction device 50 in accordance with the present invention is provided. The extraction device 50 includes a front plate 52 having a first end 54, a second end 56, and a transverse hole 58 extending through the central portion thereof. The first end 54 of the front plate 52 is configured as a fork having parallel spaced apart fork ends 54A and 54B. The fork ends 54A, 54B are elongated forming an elongate slot there between.

Where the parts of the extraction device 50 have an orientation that is parallel to the axial bore 40 of the quick-change holder 28 the portions thereof that are directed toward the left as depicted in FIGS. 3 to 5 will be described herein as being "forward," or at the "forward end," and the portions that are directed toward the right as depicted in FIGS. 3 to 5 will be described as being "rearward," or at the "rearward end" of the part. Accordingly, extending rearwardly from the front plate 52 is an upper arm 60 having a notched forward end 62 sized to be received in tongue and groove fashion between the fork ends 54A, 54B of the front plate 52. The parts are secured in tongue and groove relationship by an end plate 64. The end plate 64 has a notch 69 in the side thereof that contacts the fork ends 54A, 54B, and the notch 69 has a width equal to the space between the fork ends 54A, 54B such that the assembly of the notched end plate 64 to the fork ends 54A, 54B forms an elongate slot. A pair of spaced apart parallel holes 65, 66 extend through the end plate 64 and align with tapped holes 67, 68 in fork ends 54A, 54B respectively to receive a pair of threaded bolts 70, 71 respectively, to retain the end plate 64 across the fork ends 54A, 54B.

Figure 9:
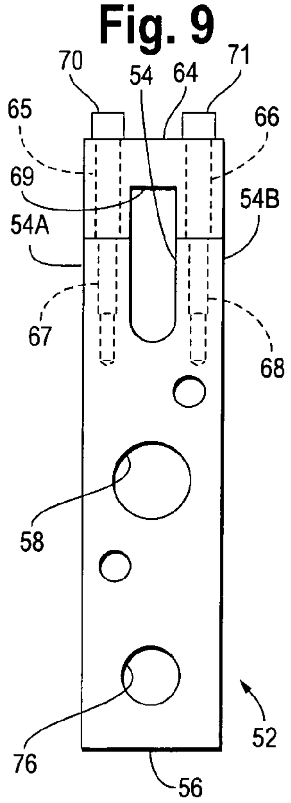
FIG. 9 is an enlarged front elevational view of the front plate with the end plate attached to the first end thereof.
Figure 10:
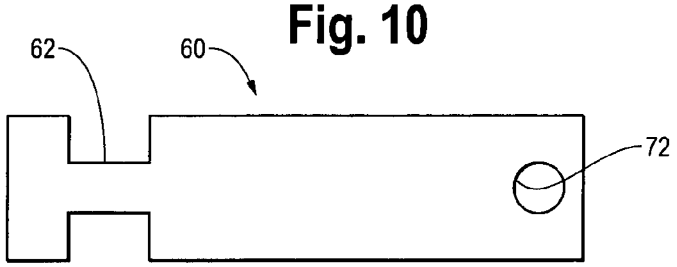
FIG. 10 is a front elevational view of the upper arm.
Figure 11:
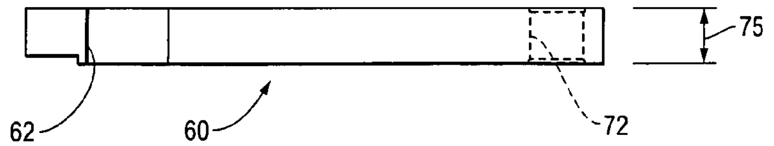
FIG. 11 is a side elevational view of the upper arm shown in FIG. 10

The rearward end of the upper arm 60 has a transverse hole 72 therein having a diameter smaller than the diameter of the transverse hole 24 in the base block mounting 10, and a cylindrical pin 74 is press fitted into hole 72 with the distal end thereof directed toward and perpendicular to the axis of the bore 24 of the base block mounting 10. An important feature of the preferred embodiment is that the rearward end of the upper arm 60 is radially moveable with respect to the bore 24 in the tubular body 16 of the base block mounting 10. As seen in FIGS. 9 to 11, this occurs because the thickness 75 of the upper arm 60 is substantially less than the length of the slot formed by the fork ends 54A and 54B. The notched portion 62 of the upper arm 60 is therefor slideable within the slot formed by fork ends 54A, 54B between a radially outward position in which the distal end of the pin 74 is spaced from the surface of the tubular body 16 of the base block mounting 10, as depicted in FIG. 4, and a radially inward position as depicted in FIG. 5, in which the distal end of the pin 74 is slideably received in the transverse hole 24 of the base block mounting.

Referring further to FIGS. 3 to 5, and 9, the second end 56 of the front plate 52 has a transverse hole 76 therein and extending through the transverse hole 76 is a threaded stud 78 having a foot 80, the rearward end of which is shaped complimentary to the support surface 26 of the base block mounting 10. Positioned along the stud 78 is an adjustment nut 82. By adjusting the position of the nut 82 along the stud 78, the distance between the end of the foot 80 and the front plate 52 can be adjusted so that the front plate 52 is oriented perpendicular to the axis defined by the axial bore 40 of the quick-change holder 28 and parallel to the rearwardly directed annular flange 34 thereof and to the forward surface 18 of the base block mounting 10.

Referring to FIGS. 3 to 5 and 7 and 8, the device further includes an enlarged transverse retaining member in the form of an extraction nut 86 and having a rearward surface 88 and extending through the extraction nut 86 perpendicular to the rearward surface 88 is a first threaded hole 90. Positioned on opposite sides of the first threaded hole 90 are second and third parallel threaded holes 92, 94. A threaded bore 85 starts at the cylindrical outer wall 87 and extends into the threaded bore 90, perpendicular to the axis thereof, and receives a set screw 89. The extraction device 50 also includes an extraction washer 91 having an outer diameter approximately equal to the outer diameter of the extraction nut 86, and having a central transverse hole 93 that is larger in diameter than the first threaded hole 90. There is also provided a second threaded stud 96, the forward end of which is threaded into the first threaded hole 90. The second end of the threaded shank 96 is extended through the central opening 93 of the washer 91, then through the centrally located transverse hole 58 of the front plate 52, and then through the axial bore 40 of the quick-change holder 28. The rearward end of the threaded stud 96 extends rearward of the rearward end 38 of the cylindrical shank 36 and a threaded nut 98 is received thereon.

A pair of bolts 100, 102 having bolt heads 104, 106 are threaded through the second and third threaded holes 92, 94 of the extraction nut 86 with the distal end of the bolts 100, 102 engaging the forward surface of the extraction washer 91 which is located on the front plate 52.

Figure 6:
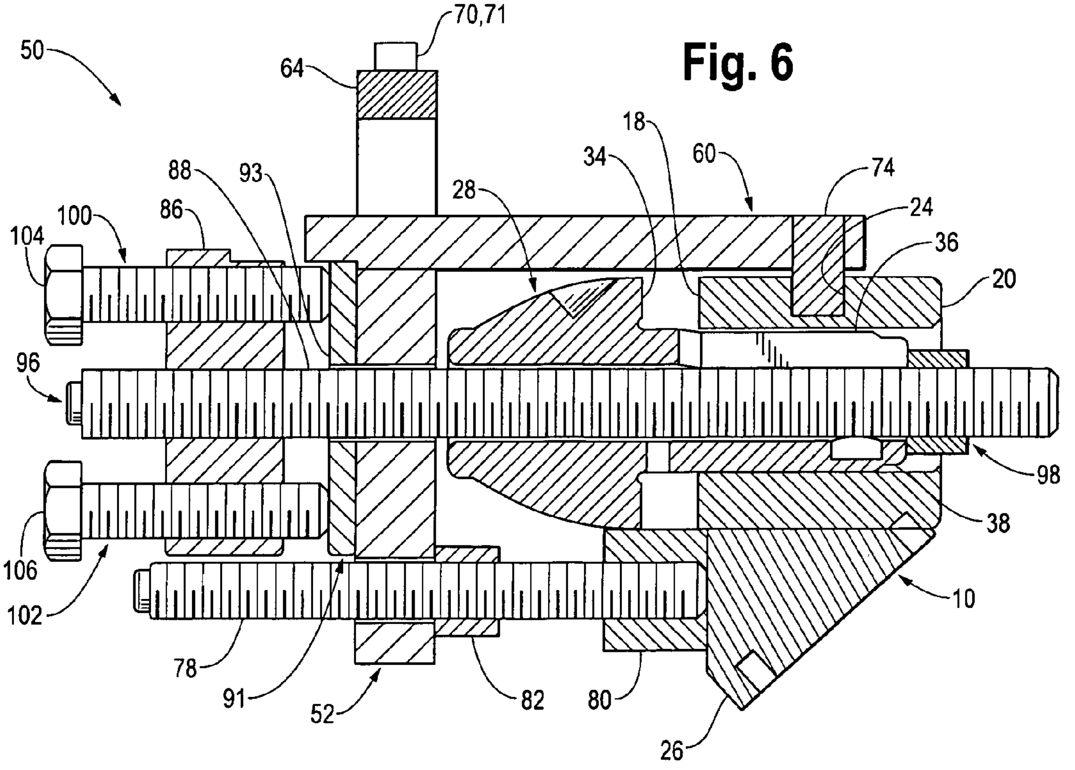
FIG. 6 is yet another cross sectional view of the parts shown in FIGS. 4 and 5, but after the quick change holder has been broken free of the base block mounting.
Figure 7:
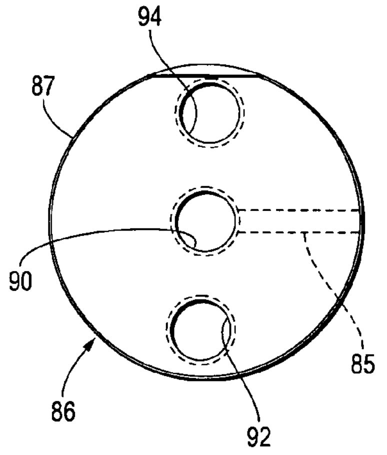
FIG. 7 is an enlarged front elevational view of the extraction nut used in the device shown in FIG. 3.
Figure 8:
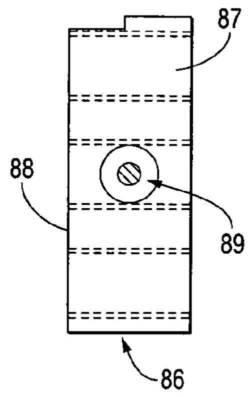
FIG. 8 is a side elevational of the extraction nut shown in FIG. 7.

With the parts assembled as described above and as depicted in FIG. 5, and the retaining nut 98 is hand tightened, the rearward surface 88 of the extraction nut 86 is compressed against the forward surface of the extraction washer 91, and the rear surface of the extraction washer is compressed against the front plate 52. Thereafter, the heads 104, 106 of the bolts 100, 102 are rotated deeper into the first and second threaded holes 92, 94 respectively. Referring to FIG. 6, the bolts 100,102 serve as leveraging tools as they are threaded deeper into the threaded holes 92, 94, and the distal ends of the bolts 100, 102 apply force against the extraction washer 91. The leveraging tools, which in this case are the bolts 100, 102, urge the extraction nut 86 forwardly away from the extraction washer 91 and the front plate 52. As the extraction nut 86 is urged away from the extraction washer 91 and the front plate 52, the retaining nut 98 is moved forwardly and thereby urges the cylindrical shank 36 of the quick-change holder 28 forwardly with respect to the base block mounting 10. Meanwhile, an opposing force is directed through the upper arm 60 and the threaded stud 78 to the base block mounting 10, with the force of the upper arm applied between a surface of the pin 74 and an inner surface of the hole 24, and the force of the threaded stud 78 applied through the foot 80 against the forward surface 26. The opposing forces cause the shank 36 of the quick change tool holder 28 to break free of locking engagement with the bore 22 in the tubular body 16 of the base block mounting 10, as depicted in FIG. 6. It is only necessary that the extraction device 50 move the shank 36 of the quick-change holder about three-eighths inch outward of the base block mounting 10 to loosen the parts sufficiently that they may be thereafter separated using an elongate tool and a hammer. The extraction device 50 is preferably designed to cause an axial movement of three-fourths of an inch, which fully extracts the quick change tool holder 28 from the interference fit with the bore 22.

In the course of breaking the quick change tool holder 28 free from the base block mounting 10 a great amount of force is applied to the threads of the extraction nut 86, the threaded stud 96 and the retaining nut 98. I have found that it is desirable that the threads of these three parts be ACME threads because ACME threads spread the forces applied to the threads over a larger surface area. The threads are therefore able to endure a greater amount of force without failing. Alternately, a larger diameter stud 96 may be used having standard "V" type threads.

Prior to the assembly of the extraction device 50, the distal end of a hand held punch, not shown, can be positioned against the forward surface of the plunger 42 after which the opposite end of the punch is struck with a hammer to break the retaining pin 44 and drive the plunger 42 out of the cylindrical bore 40. Once the plunger 42 has been removed, the extraction device 50 can be assembled around the combined base block mounting 10 and quick-change holder 28.

Referring to FIGS. 3, 5, 6, 9, and 11, to assemble the device 50, the forward end 62 of the upper arm 60 is slideably fitted between the fork ends 54A, 54B of the front plate 52 with the distal end of the pin 74 directed toward the axis of the hole 58 in the front plate 52. The end plate 64 is then secured by bolts 70, 71 to the fork ends 54A, 54B to retain the upper arm to the front plate 52. The upper arm 60 is moved radially outward within the slot formed by fork ends 54A, 54B to the first position, shown in FIG. 4, and the rearward end of the upper arm 60 is positioned around the outer surface of the base block mounting 10 until it is aligned with the axis of the hole 24 therein. At the same time foot 80 is positioned against the support surface 26 of the base block mounting 10. The upper arm 60 is then moved radially inward within the slot formed by fork ends 54A, 54B to the second position, shown in FIG. 5, thereby slideably inserting the distal end of the pin 74 into hole 24 of the base block mounting 10. The adjusting nut 82 is then adjusted along the length of the threaded stud 78 until the front plate 54 is perpendicular to the axis of the bore 22 in the tubular body 16 of the base block mounting 10 and the central hole 58 is aligned in front of the forward opening of the bore 22. The forward end of the second threaded stud 96 is threaded into the threaded hole 90 of the extraction nut 86 and the two parts are locked against rotation with respect to one another by tightening the set screw 89. The rearward end of the threaded stud 96 is then passed through the central opening 93 of the extraction washer 91, the central hole 58 on the front plate 52 and then through the axial bore 40 of the quick change tool holder 28. The threaded stud 96 is retained in place by the retaining nut 98 which can be hand tightened against the rear end 38 of the quick change tool holder 28 by holding the extraction nut 86 against rotation. Thereafter, the bolts 100, 102 are threaded into the second and third holes 92, 94 of the extraction nut 86 and the heads of the bolts 100, 102 are further rotated until the shank 36 of the quick-change holder 28 breaks free from the bore 22. Once the quick change holder 28 has been broken free of base block mounting 10, a punch and a hammer can be used to complete the extraction of the quick change holder, or bolts 100, 102 can be rotated until quick-change holder 28 is completely separated from bore 22 of base block 10.

The invention has been described as employing one or more jack screws 100, 102 as a leveraging tool for applying a separating force between the extraction nut 86 and the front plate 52 but there are equivalent leveraging tools that may be substituted for the jack screws 100, 102, such as a hydraulic or pneumatic cylinder. Also, the device may be constructed with the extraction nut 86 and the stud 96 bonded to each other to form a single part with the extraction nut forming an enlarged transverse head 86 of an elongate extraction bolt having a threaded shank 96.

While the present invention has been described with respect to a single embodiment, it will be appreciated that many modifications and variations may be made without departing from the spirit and scope of the invention. It is therefore the intent of the appended claims to cover all such modifications and variations that fall within the true spirit and scope of the invention.

What is claimed is:

1. A device for extracting a quick-change tool holder from locking engagement with a base block mounting of a machine wherein said quick-change tool holder has a forward surface, a rearwardly extending generally cylindrical shank, a rearward end, and an axial bore extending into said forward surface and through said generally cylindrical shank to said rearward end, and said base block mounting has a body with an outer surface, a forward surface, a rearward surface and a central opening extending from said forward surface to said rearward surface, said shank of said quick change tool holder being tightly fitted within said central opening of said base block mounting, said device comprising a front plate, a first arm and a second arm extending rearwardly from opposing ends of said front plate, contact surfaces on rearward ends of said first and second arms for engaging opposing portions of said outer surface of said base block mounting, said front plate having a transverse hole therein, a threaded stud having a forward end, a rearward end and a length an extraction nut having a first threaded hole therein and a second threaded hole parallel to said first threaded hole said forward end of said threaded stud threadedly received in said first threaded hole, said length of said threaded stud rearward of said extraction nut extending through said transverse hole and through said axial bore, a retaining nut threaded on said rearward end of said threaded stud, a jack screw having a head, a threaded portion and a distal end, said jack screw threaded through said second threaded hole with said distal end against said front plate wherein rotation of said head of said jack screws will draw said generally cylindrical shank out of said base block mounting.

2. The device of claim 1 wherein said second arm is an elongate threaded stud having a distal end, and said distal end of said second arm abuts a surface on said base block mounting.

3. The device of claim 1 and further comprising a second jack screw threaded into a third threaded hole in said extraction nut.

4. The device of claim 1 wherein said contact surface on said first arm is a surface of a cylindrical member that contacts a surface of a cylindrical bore of said base block mounting.

5. The device of claim 1 wherein said threaded stud has ACME threads.

6. The device of claim 1 wherein said threads are "V" threads.

7. The device of claim 1 and further comprising a washer on said threaded stud between said forward plate and said extraction nut.

8. A device for extracting a quick-change tool holder from locking engagement with a base block mounting of a machine wherein said quick-change tool holder has a forward surface, a rearwardly extending generally cylindrical shank, a rearward end, and an axial bore extending into said forward surface and through said generally cylindrical shank to said rearward end, and said base block mounting has a body with an outer surface, a forward surface, a rearward surface and a central opening extending from said forward surface to said rearward surface, said shank of said quick change tool holder being tightly fitted within said central opening of said base block mounting, said device comprising a front plate, a first arm and a second arm extending rearwardly from opposing ends of said front plate, contact surfaces on rearward ends of said first and second arms for engaging opposing portions of said outer surface of said base block mounting, said front plate having a transverse hole therein, a threaded stud having a forward end, a rearward end and a length, an extraction nut having a threaded hole therein for threadedly receiving said threaded stud, said extraction nut threaded on said forward end of said threaded stud, said length of said threaded stud rearward of said extraction nut extending through said transverse hole and through said axial bore, a leveraging tool applying force between said extraction nut and said front plate, and a retaining nut threaded on said rearward end of said threaded stud wherein said leveraging tool will urge said transverse head away from said front plate and draw said quick change tool holder out of said base block mounting.

9. A device for extracting a quick-change tool holder from locking engagement with a base block mounting of a machine wherein said quick-change tool holder has a forward surface, a rearwardly extending generally cylindrical shank, a rearward end, and an axial bore extending into said forward surface and through said generally cylindrical shank to said rearward end, and said base block mounting has a body with an outer surface, a forward surface, a rearward surface and a central opening extending from said forward surface to said rearward surface, said shank of said quick change tool holder being tightly fitted within said central opening of said base block mounting, said device comprising a front plate, a first arm and a second arm extending rearwardly from opposing ends of said front plate, contact surfaces on rearward ends of said first and second arms for engaging opposing portions of said outer surface of said base block mounting, said front plate having a transverse hole therein, a threaded stud having a forward end, a rearward end and a length, a transverse head on said forward end of said threaded stud, said length of said threaded stud rearward of said transverse head extending through said transverse hole and through said axial bore, said transverse head having a threaded hole therein, said threaded hole extending parallel to said length of said threaded stud, a bolt having a transverse head, a threaded shank and a distal end, said threaded shank of said bolt threaded through said threaded hole in said transverse head wherein said distal end of said bolt applies force against said front plate, a retaining nut threaded on said rearward end of said threaded stud wherein said leveraging tool will urge said transverse head away from said front plate and draw said quick change tool holder out of said base block mounting.

10. The device of claim 9 wherein said second arm is longitudinally adjustable for positioning said forward plate perpendicular to said axial bore.

11. The device of claim 9 wherein said second arm is an elongate threaded stud having a distal end, and said distal end of said second arm abuts a surface on said base block mounting.

12. The device of claim 9 and further comprising a second threaded bolt threaded into a second threaded hole in said transverse head.

13. The device of claim 9 and further comprising a washer on said threaded stud between said transverse head and said forward plate.

14. The device of claim 9 wherein said contact surface on said first arm is a surface of a cylindrical member that contacts a surface of a cylindrical bore in said base block mounting.

15. The device of claim 9 wherein said threaded stud has ACME threads.

16. The device of claim 9 wherein said threads are "V" threads.

17. The device of claim 9 and further comprising a washer on said threaded stud between said transverse head and said forward plate.

18. The device of claim 9 wherein said transverse head is a nut threaded on said threaded stud.

* * * * *